(No Model.)
J. STORMER.
HAY RACK.
No. 314,746. Patented Mar. 31, 1885.
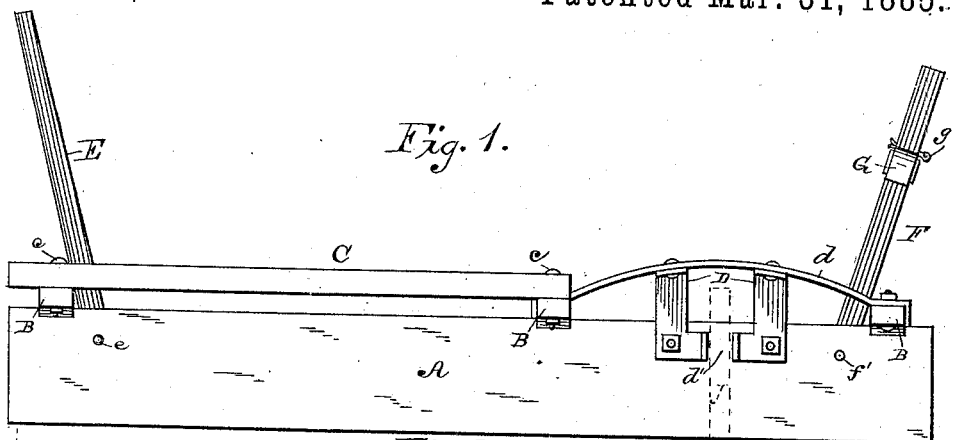
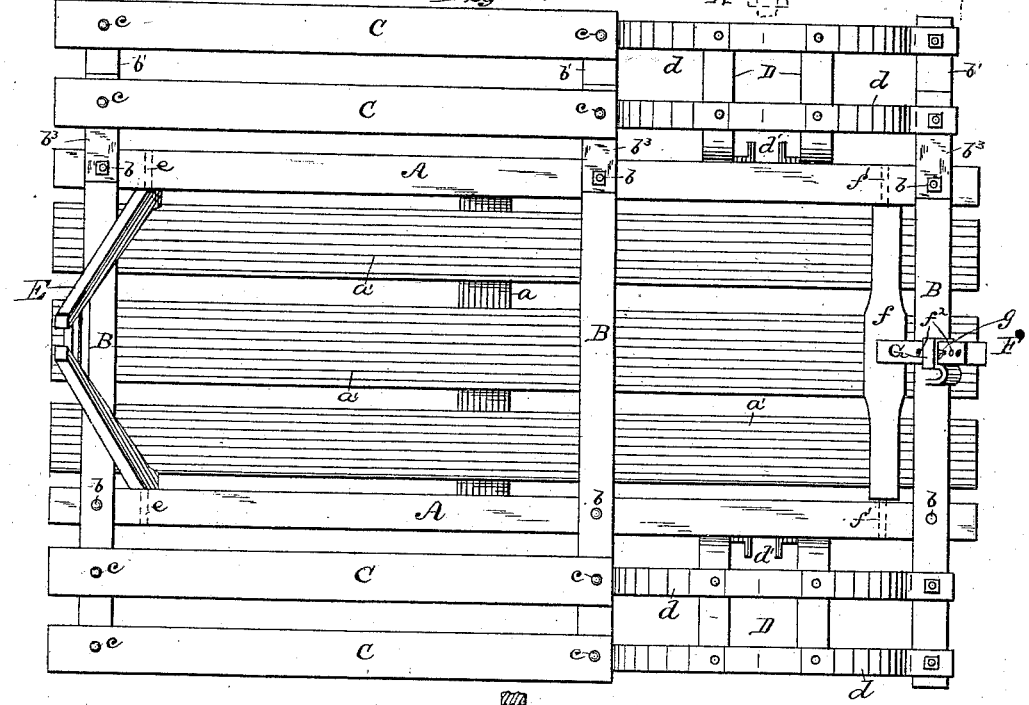
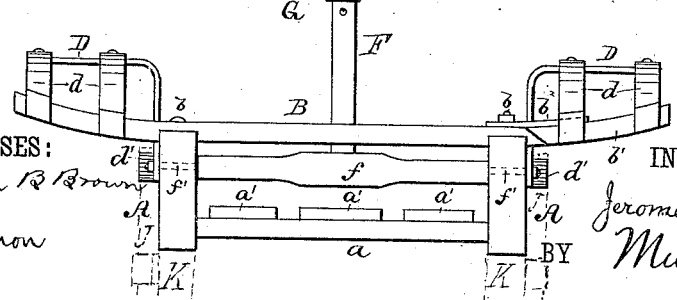
WITNESSES:
Harrison B. Brown
Colon C. Kemon
INVENTOR:
Jerome Stormer
BY Munn & Co.
ATTORNEYS.

UNITED STATES PATENT OFFICE.

JEROME STORMER, OF MOLINE, OHIO.

HAY-RACK.

SPECIFICATION forming part of Letters Patent No. 314,746, dated March 31, 1885.

Application filed October 16, 1884. (No model.)

*To all whom it may concern:*

Be it known that I, JEROME STORMER, a citizen of the United States, residing at Moline, in the county of Wood and State of Ohio, have invented certain new and useful Improvements in Hay-Racks, of which the following is a description.

Figure 1 represents a side elevation of my improved hay-rack. Fig. 2 is a plan view of the same. Fig. 3 is an end view of the hay-rack, looking at it from the rear end.

My invention relates to racks which may be fastened upon ordinary farm-wagons to render them better adapted for carrying hay. It consists in the detailed construction of the parts, hereinafter fully described, by which the hay rack is prevented from moving back and forth on top of the wagon, and the hay, when loaded on it, is kept from clogging the wheels, and by which it may be readily taken apart for shipment.

I will now proceed to describe my invention with reference to the accompanying drawings, in which similar letters of reference indicate corresponding parts.

A are the main beams, to be placed on the top of the wagon. These are united by cross-beams $a$, upon which is laid the open platform $a'$.

B are beams fastened to the top of main beams A by the bolts $b$. These beams may each be made of one solid piece; but I generally prefer to make the ends of them, $b'$, loose, and secure these loose ends to the main portion of beams B by plates of iron $b^2$.

C are longitudinal boards bolted to the ends $b'$ of the beams B by bolts $c$.

D are the wheel-guards bolted to beams A between two of the beams B. They are provided with cross-pieces $d$, bent over them and forming a continuation of the longitudinal boards C. The ends of wheel-guards D are bent round, and form sockets $d'$, which engage with stakes J, fastened on the sides K of the wagon, and retain the hay-rack in position.

E is a light frame hinged between the beams A by pins $e$, which prevents the hay when loaded on the rack from sliding off at the front end.

F is an upright secured to a cross-piece, $f$, working on the pins $f'$ at the back part of the rack. The upright F has a series of holes, $f^2$, in it, and is provided with an attachment, G, and a pin, $g$, passing through one of the holes $f^2$. A pole is fastened to the top of frame E. It passes over the top of the hay and is secured to the hook of the catch G, the position of which can be regulated by sliding it upon the upright F. The pin $g$ prevents the catch G from slipping up when the pole is strained tightly over the hay on the rack.

Having thus described my invention, what I claim as new, and desire to secure by Letters Patent, is—

1. In a hay-rack, the combination of the longitudinal beams A, the transverse beams B, secured on top of the beams A, and extending beyond the sides thereof, the arched pieces $d$, secured at their ends to the beams B, and the guards D, secured to the sides of beams A, and extending upward and outward and secured as supports to the arch of the pieces $d$, substantially as shown and described.

2. The combination, with the hay-rack described, of the post F, provided with a series of holes, $f^2$, and the pin $g$ therefor, and the catch G, fitted to slide upon the said post, and provided with a hook projecting from one side, substantially as shown and described, whereby the said catch G may be fixed at any desired height upon the post F, and a binder-pole be secured when swung under the said hook.

JEROME STORMER.

Witnesses:
JOHN J. JOHNSON,
H. D. GROVE.